(12) United States Patent
Ely

(10) Patent No.: US 10,037,006 B2
(45) Date of Patent: Jul. 31, 2018

(54) COMPRESSIBLE SEAL FOR ROTATABLE AND TRANSLATABLE INPUT MECHANISMS

(71) Applicant: Apple Inc., Cupertino, CA (US)

(72) Inventor: Colin M. Ely, Cupertino, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 15/269,130

(22) Filed: Sep. 19, 2016

(65) Prior Publication Data

US 2017/0003655 A1 Jan. 5, 2017

Related U.S. Application Data

(63) Continuation of application No. 15/064,057, filed on Mar. 8, 2016.

(Continued)

(51) Int. Cl.
G04B 3/04 (2006.01)
G04B 37/10 (2006.01)
(Continued)

(52) U.S. Cl.
CPC ............. *G04B 37/106* (2013.01); *G04B 3/04* (2013.01); *G04B 27/02* (2013.01); *G04B 37/081* (2013.01);
(Continued)

(58) Field of Classification Search
CPC ...... G04G 21/00; G04B 27/02; G04B 37/106; G04B 7/081; G04B 3/04; G04C 3/005;
(Continued)

(56) References Cited

U.S. PATENT DOCUMENTS 2,237,860 A * 4/1941 Bolle .................... G04B 37/10
368/289
2,288,215 A 6/1942 Taubert et al.
(Continued)

FOREIGN PATENT DOCUMENTS

CH 1888928 1/1937
CN 1302740 9/2001
(Continued)

OTHER PUBLICATIONS

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.
(Continued)

*Primary Examiner* — Sean Kayes
(74) *Attorney, Agent, or Firm* — Brownstein Hyatt Farber Schreck, LLP

(57) ABSTRACT

An electronic device has a housing and a rotatable and translatable input mechanism. The housing has an aperture and the rotatable and translatable input mechanism has a shaft positioned at least partially within the aperture and a manipulation structure coupled to the shaft. The manipulation structure may be manipulated to rotationally and translationally move the shaft to provide rotational and translational input to the electronic device. A compressible seal is positioned in a gap between the housing and the rotatable and translatable input mechanism. The compressible seal may resist and/or prevent passage of contaminants into the aperture and/or obscure one or more internal components. The compressible seal may be configured to collapse or bend when the rotatable and translatable member translates.

15 Claims, 9 Drawing Sheets

Related U.S. Application Data

(60) Provisional application No. 62/129,953, filed on Mar. 8, 2015.

(51) Int. Cl.
| | |
|---|---|
| *G05G 9/04* | (2006.01) |
| *G05G 1/02* | (2006.01) |
| *G05G 1/08* | (2006.01) |
| *G05G 5/05* | (2006.01) |
| *G05G 25/04* | (2006.01) |
| *G04G 21/00* | (2010.01) |
| *H01H 25/06* | (2006.01) |
| *G06F 3/0362* | (2013.01) |
| *G04B 37/08* | (2006.01) |
| *G04C 3/00* | (2006.01) |
| *G04B 27/02* | (2006.01) |

(52) U.S. Cl.
CPC ............ *G04C 3/005* (2013.01); *G04G 21/00* (2013.01); *G05G 1/025* (2013.01); *G05G 1/08* (2013.01); *G05G 5/05* (2013.01); *G05G 9/04* (2013.01); *G05G 25/04* (2013.01); *G06F 3/0362* (2013.01); *H01H 25/06* (2013.01); *H01H 25/065* (2013.01); *H01H 2300/016* (2013.01)

(58) Field of Classification Search
CPC ............ G05G 1/025; G05G 1/08; G05G 5/05; G05G 25/04; G05G 9/04; H01H 25/06; H01H 25/065; H01H 2300/016; G06F 3/0362
See application file for complete search history.

(56) References Cited

U.S. PATENT DOCUMENTS

| | | | |
|---|---|---|---|
| 2,497,935 A * | 2/1950 | Feurer | G04B 37/10 |
| | | | 277/384 |
| 2,771,734 A | 11/1956 | Morf | |
| 2,788,236 A | 4/1957 | Kafowi | |
| 2,797,592 A | 7/1957 | Marrapese | |
| 3,040,514 A | 6/1962 | Dinstman | |
| 3,056,030 A | 9/1962 | Kelchner | |
| 3,130,539 A | 4/1964 | Davis | |
| 3,355,873 A | 12/1967 | Morf | |
| 3,410,247 A | 11/1968 | Dronberger | |
| 3,495,398 A * | 2/1970 | Wessel | G04B 39/02 |
| | | | 368/291 |
| 3,577,876 A | 5/1971 | Spadini | |
| 3,621,649 A * | 11/1971 | Vulcan | G04B 37/10 |
| | | | 368/290 |
| 3,662,618 A | 5/1972 | Kroll et al. | |
| 4,007,347 A | 2/1977 | Haber | |
| 4,031,341 A | 6/1977 | Wuthrich et al. | |
| 4,037,068 A | 7/1977 | Gaynor | |
| 4,077,200 A * | 3/1978 | Schneider | G04C 3/005 |
| | | | 200/331 |
| 4,133,404 A | 1/1979 | Griffin | |
| 4,170,104 A | 10/1979 | Yamagata | |
| 4,258,096 A | 3/1981 | LaMarche | |
| 4,287,400 A | 9/1981 | Kitik | |
| 4,289,400 A | 9/1981 | Kubola et al. | |
| 4,311,026 A | 1/1982 | Ochoa | |
| 4,311,990 A | 1/1982 | Burke | |
| 4,324,956 A | 4/1982 | Sakakino et al. | |
| 4,345,119 A | 8/1982 | Latasiewicz | |
| 4,364,674 A * | 12/1982 | Tesch | G04B 37/106 |
| | | | 368/308 |
| 4,379,642 A | 4/1983 | Meyrat | |
| 4,395,134 A | 7/1983 | Luce | |
| 4,417,824 A | 11/1983 | Paterson et al. | |
| 4,581,509 A | 4/1986 | Sanford et al. | |
| 4,600,316 A | 7/1986 | Besson | |
| 4,617,461 A | 10/1986 | Subbarao et al. | |
| 4,634,861 A | 1/1987 | Ching et al. | |
| 4,641,026 A | 2/1987 | Garcia, Jr. | |
| 4,670,737 A | 6/1987 | Rilling | |
| 4,766,642 A | 8/1988 | Gaffney et al. | |
| 4,783,772 A | 11/1988 | Umemoto et al. | |
| 4,884,073 A | 11/1989 | Souloumiac | |
| 4,914,831 A | 4/1990 | Kanezashi et al. | |
| 4,922,070 A | 5/1990 | Dorkinski | |
| 4,931,794 A | 6/1990 | Haag | |
| 4,952,799 A | 8/1990 | Loewen | |
| 4,980,685 A | 12/1990 | Souloumiac et al. | |
| 4,987,299 A | 1/1991 | Kobayashi et al. | |
| 5,034,602 A | 7/1991 | Garcia et al. | |
| 5,214,278 A | 5/1993 | Banda | |
| 5,258,592 A | 11/1993 | Nishikawa et al. | |
| 5,288,993 A | 2/1994 | Bidiville et al. | |
| 5,347,123 A | 9/1994 | Jackson et al. | |
| 5,383,166 A | 1/1995 | Gallay | |
| 5,471,054 A | 11/1995 | Watanabe | |
| 5,509,174 A | 4/1996 | Worrell | |
| 5,572,314 A | 11/1996 | Hyman et al. | |
| 5,583,560 A | 12/1996 | Florin et al. | |
| 5,631,881 A * | 5/1997 | Pessey | G04C 3/001 |
| | | | 368/290 |
| 5,726,645 A | 3/1998 | Kamon et al. | |
| 5,748,111 A | 5/1998 | Bates | |
| 5,825,353 A | 10/1998 | Will | |
| 5,841,050 A | 11/1998 | Clift et al. | |
| 5,847,335 A | 12/1998 | Sugahara et al. | |
| 5,867,082 A | 2/1999 | Van Zeeland | |
| 5,943,233 A | 8/1999 | Ebina | |
| 5,953,001 A | 9/1999 | Challener et al. | |
| 5,963,332 A | 10/1999 | Feldman et al. | |
| 6,069,567 A | 5/2000 | Zawilski | |
| 6,134,189 A | 10/2000 | Carrard | |
| 6,154,201 A | 11/2000 | Levin et al. | |
| 6,175,679 B1 | 1/2001 | Veligdan et al. | |
| 6,246,050 B1 | 6/2001 | Tullis et al. | |
| 6,252,825 B1 | 6/2001 | Perotto | |
| 6,304,247 B1 | 10/2001 | Black | |
| 6,355,891 B1 | 3/2002 | Ikunami | |
| 6,392,640 B1 | 5/2002 | Will | |
| 6,422,740 B1 | 7/2002 | Leuenberger | |
| 6,477,117 B1 | 11/2002 | Narayanaswami et al. | |
| 6,502,982 B1 | 1/2003 | Bach et al. | |
| 6,525,278 B2 | 2/2003 | Villain et al. | |
| 6,556,222 B1 | 4/2003 | Narayanaswami | |
| 6,575,618 B1 | 6/2003 | Inoue et al. | |
| 6,587,400 B1 | 7/2003 | Line | |
| 6,646,635 B2 | 11/2003 | Pogatetz et al. | |
| 6,661,438 B1 | 11/2003 | Billman | |
| 6,672,758 B2 | 1/2004 | Ehrsam et al. | |
| 6,794,992 B1 | 9/2004 | Rogers | |
| 6,809,275 B1 | 10/2004 | Cheng et al. | |
| 6,834,430 B2 | 12/2004 | Worrell | |
| 6,846,998 B2 | 1/2005 | Hasumi et al. | |
| 6,888,076 B2 | 5/2005 | Hetherington | |
| 6,896,403 B1 | 5/2005 | Gau | |
| 6,909,378 B1 | 6/2005 | Lambrechts et al. | |
| 6,914,551 B2 | 7/2005 | Vidal | |
| 6,961,099 B2 | 11/2005 | Takano et al. | |
| 6,963,039 B1 | 11/2005 | Weng et al. | |
| 6,985,107 B2 | 1/2006 | Anson | |
| 6,987,568 B2 | 1/2006 | Dana | |
| 6,998,553 B2 | 2/2006 | Hisamune et al. | |
| 7,016,263 B2 | 3/2006 | Gueissaz et al. | |
| 7,034,237 B2 | 4/2006 | Ferri et al. | |
| 7,081,905 B1 | 7/2006 | Raghunath et al. | |
| 7,102,626 B2 | 9/2006 | Denny, III | |
| 7,111,365 B2 | 9/2006 | Howie, Jr. | |
| 7,119,289 B2 | 10/2006 | Lacroix | |
| 7,135,673 B2 | 11/2006 | Saint Clair | |
| 7,167,083 B2 | 1/2007 | Giles | |
| 7,244,927 B2 | 7/2007 | Huynh | |
| 7,255,473 B2 | 8/2007 | Hiranuma et al. | |
| 7,265,336 B2 | 9/2007 | Hataguchi et al. | |
| 7,274,303 B2 | 9/2007 | Dresti et al. | |

(56) References Cited

U.S. PATENT DOCUMENTS

| | | |
|---|---|---|
| 7,285,738 B2 | 10/2007 | Lavigne et al. |
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,404,667 B2 | 7/2008 | Born et al. |
| 7,465,917 B2 | 12/2008 | Chin et al. |
| 7,506,269 B2 | 3/2009 | Lang et al. |
| 7,520,664 B2 | 4/2009 | Wai |
| 7,528,824 B2 | 5/2009 | Kong |
| 7,545,367 B2 | 6/2009 | Sunda et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,682,070 B2 | 3/2010 | Burton |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,597 B2 | 9/2010 | Silverstein et al. |
| 7,858,583 B2 | 12/2010 | Schmidt et al. |
| 7,865,324 B2 | 1/2011 | Lindberg |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,312,495 B2 | 11/2012 | Vanderhoff |
| 8,368,677 B2 | 2/2013 | Yamamoto |
| 8,371,745 B2 | 2/2013 | Manni |
| 8,373,661 B2 | 2/2013 | Lan et al. |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,783,944 B2 | 2/2014 | Doi |
| 8,666,682 B2 | 3/2014 | LaVigne et al. |
| 8,704,787 B2 | 4/2014 | Yamamoto |
| 8,711,093 B2 | 4/2014 | Ong et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,804,993 B2 | 8/2014 | Shukla et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,859,971 B2 | 10/2014 | Weber |
| 8,860,674 B2 | 10/2014 | Lee et al. |
| 8,863,219 B2 | 10/2014 | Brown et al. |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,920,022 B2 * | 12/2014 | Ishida .................. G04B 37/106 |
| | | 368/290 |
| 8,922,399 B2 | 12/2014 | Bajaj et al. |
| 8,928,452 B2 | 1/2015 | Kim et al. |
| 8,994,827 B2 | 3/2015 | Mistry et al. |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,041,663 B2 | 5/2015 | Westerman |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,105,413 B2 | 8/2015 | Hiranuma et al. |
| 9,123,483 B2 | 9/2015 | Ferri et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,350,850 B2 | 5/2016 | Pope et al. |
| 9,430,042 B2 | 8/2016 | Levin |
| 9,437,357 B2 | 9/2016 | Furuki et al. |
| 9,449,770 B2 | 9/2016 | Sanford et al. |
| 9,632,318 B2 | 4/2017 | Goto et al. |
| 9,800,717 B2 | 10/2017 | Ma et al. |
| 9,836,025 B2 | 12/2017 | Ely et al. |
| 2003/0174590 A1 * | 9/2003 | Arikawa ................ G04C 3/001 |
| | | 368/319 |
| 2004/0082414 A1 | 4/2004 | Knox |
| 2004/0130971 A1 | 7/2004 | Ecoffet et al. |
| 2004/0264301 A1 | 12/2004 | Howard et al. |
| 2005/0075558 A1 | 4/2005 | Vecerina et al. |
| 2006/0250377 A1 | 11/2006 | Zadesky et al. |
| 2007/0013775 A1 | 1/2007 | Shin |
| 2007/0050054 A1 | 3/2007 | Sambandam Guruparan et al. |
| 2007/0211042 A1 | 9/2007 | Kim et al. |
| 2007/0222756 A1 | 9/2007 | Wu et al. |
| 2007/0229671 A1 | 10/2007 | Takeshita et al. |
| 2007/0247421 A1 | 10/2007 | Orsley et al. |
| 2008/0130914 A1 | 6/2008 | Cho |
| 2008/0207281 A1 | 8/2008 | Tsuchiya et al. |
| 2009/0051649 A1 | 2/2009 | Rondel |
| 2009/0073119 A1 | 3/2009 | Le et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0285443 A1 | 11/2009 | Camp et al. |
| 2009/0312051 A1 | 12/2009 | Hansson et al. |
| 2010/0033430 A1 | 2/2010 | Kakutani et al. |
| 2010/0053468 A1 | 3/2010 | Havrill |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0242064 A1 | 10/2011 | Ono et al. |
| 2012/0067711 A1 | 3/2012 | Yang |
| 2012/0068833 A1 | 3/2012 | Rothkopf et al. |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0335196 A1 | 12/2013 | Zhang et al. |
| 2014/0071050 A1 | 3/2014 | Armstrong-Muntner |
| 2014/0071098 A1 | 3/2014 | You |
| 2014/0132516 A1 | 5/2014 | Tsai et al. |
| 2014/0197936 A1 | 7/2014 | Biggs et al. |
| 2014/0233359 A1 * | 8/2014 | Ishida .................. G04B 37/106 |
| | | 368/290 |

(56) References Cited

U.S. PATENT DOCUMENTS

| | | |
|---|---|---|
| 2014/0327630 A1 | 11/2014 | Burr et al. |
| 2014/0340318 A1 | 11/2014 | Stringer et al. |
| 2014/0347289 A1 | 11/2014 | Suh et al. |
| 2015/0041289 A1 | 2/2015 | Ely |
| 2015/0124415 A1 | 5/2015 | Goyal et al. |
| 2015/0186609 A1 | 7/2015 | Utter, II |
| 2015/0221460 A1 | 8/2015 | Teplitxky et al. |
| 2015/0227217 A1 | 8/2015 | Fukumoto |
| 2015/0341031 A1 | 11/2015 | Marquas et al. |
| 2016/0054813 A1 | 2/2016 | Shediwy et al. |
| 2016/0058375 A1 | 3/2016 | Rothkopf et al. |
| 2016/0061636 A1 | 3/2016 | Gowreesunker et al. |
| 2016/0062623 A1 | 3/2016 | Howard et al. |
| 2016/0069713 A1 | 3/2016 | Ruh et al. |
| 2016/0098016 A1 | 4/2016 | Ely et al. |
| 2016/0103985 A1 | 4/2016 | Shim et al. |
| 2016/0109861 A1 | 4/2016 | Kim et al. |
| 2016/0116306 A1 | 4/2016 | Ferri et al. |
| 2016/0168178 A1 | 6/2016 | Misra |
| 2016/0253487 A1 | 9/2016 | Sarkar et al. |
| 2016/0258784 A1 | 9/2016 | Boonsom et al. |
| 2016/0306437 A1 | 10/2016 | Zhang et al. |
| 2016/0306446 A1 | 10/2016 | Chung et al. |
| 2016/0313703 A1 | 10/2016 | Ely et al. |
| 2016/0327911 A1 | 11/2016 | Eim et al. |
| 2016/0378069 A1 | 12/2016 | Rothkopf et al. |
| 2016/0378070 A1 | 12/2016 | Rothkopf et al. |
| 2016/0378071 A1 | 12/2016 | Rothkopf et al. |
| 2016/0378072 A1 | 12/2016 | Ely et al. |
| 2017/0010751 A1 | 1/2017 | Shedletsky |
| 2017/0011873 A1 | 1/2017 | Ely et al. |
| 2017/0045958 A1 | 2/2017 | Battlogg et al. |
| 2017/0061863 A1 | 3/2017 | Eguchi |
| 2017/0069443 A1 | 3/2017 | Wang et al. |
| 2017/0069444 A1 | 3/2017 | Wang et al. |
| 2017/0069447 A1 | 3/2017 | Wang et al. |
| 2017/0104902 A1 | 4/2017 | Kim et al. |
| 2017/0139489 A1 | 5/2017 | Chen et al. |
| 2017/0192391 A1 | 7/2017 | Ely et al. |
| 2017/0248986 A1 | 8/2017 | Jackson et al. |
| 2017/0269715 A1 | 9/2017 | Kim et al. |
| 2017/0285404 A1 | 10/2017 | Kubota et al. |
| 2017/0301314 A1 | 10/2017 | Kim et al. |
| 2017/0307414 A1 | 10/2017 | Ferri et al. |
| 2017/0331869 A1 | 11/2017 | Bendahan et al. |
| 2017/0357465 A1 | 12/2017 | Dzeryn et al. |
| 2018/0018026 A1 | 1/2018 | Bushnell et al. |
| 2018/0024683 A1 | 1/2018 | Ely et al. |

FOREIGN PATENT DOCUMENTS

| | | |
|---|---|---|
| CN | 1445627 | 10/2003 |
| CN | 1504843 | 6/2004 |
| CN | 1624427 | 6/2005 |
| CN | 1792295 | 6/2006 |
| CN | 101201587 | 6/2008 |
| CN | 201081979 | 7/2008 |
| CN | 101750958 | 6/2010 |
| CN | 101923314 | 12/2010 |
| CN | 202008579 | 10/2011 |
| CN | 102890443 | 1/2013 |
| CN | 202710937 | 1/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103956006 | 7/2014 |
| CN | 203693601 | 7/2014 |
| CN | 203732900 | 7/2014 |
| CN | 103995456 | 8/2014 |
| CN | 203941395 | 11/2014 |
| CN | 104777987 | 4/2015 |
| CN | 104880937 | 9/2015 |
| CN | 204650147 | 9/2015 |
| CN | 105096979 | 11/2015 |
| CN | 105547146 | 5/2016 |
| DE | 3706194 | 9/1988 |
| DE | 102008023651 | 11/2009 |
| EP | 0556155 | 8/1993 |
| EP | 1345095 | 9/2003 |
| EP | 1669724 | 6/2006 |
| EP | 1832969 | 9/2007 |
| EP | 2375295 | 10/2011 |
| EP | 2720129 | 4/2014 |
| FR | 2030093 | 10/1970 |
| FR | 2801402 | 5/2001 |
| GB | 2433211 | 6/2007 |
| JP | S5708582 | 1/1982 |
| JP | S5734457 | 2/1982 |
| JP | H05203465 | 8/1993 |
| JP | 11121210 | 4/1999 |
| JP | H11191508 | 7/1999 |
| JP | 2001202178 | 7/2001 |
| JP | 2003151410 | 5/2003 |
| JP | 2003331693 | 11/2003 |
| JP | 2004184396 | 7/2004 |
| JP | 2007311153 | 11/2007 |
| JP | 2008053980 | 3/2008 |
| JP | 2008122377 | 5/2008 |
| JP | 2008235226 | 10/2008 |
| JP | 2009070657 | 4/2009 |
| JP | 2010186572 | 8/2010 |
| JP | 2010244797 | 10/2010 |
| JP | 2011165468 | 8/2011 |
| JP | 2013079961 | 5/2013 |
| KR | 20080045397 | 5/2008 |
| NL | 1040225 | 11/2014 |
| TW | 200633681 | 10/2006 |
| WO | WO2001/022038 | 3/2001 |
| WO | WO2001/069567 | 9/2001 |
| WO | WO2010/058376 | 5/2010 |
| WO | WO2012/083380 | 6/2012 |
| WO | WO2012/094805 | 7/2012 |
| WO | WO2014/018118 | 1/2014 |
| WO | WO2015/147756 | 10/2015 |
| WO | WO2016/104922 | 6/2016 |
| WO | WO2016/155761 | 10/2016 |

OTHER PUBLICATIONS

Author Unknown, "mHealth," http://mhealth.vesag.com/?m=201012, 7 pages, Dec. 23, 2010.

Author Unknown, "mHealth Summit 2010," http://www.virtualpressoffice.com/eventsSubmenu.do?page=exhibitorPage&showId=1551&companyId=5394, 5 pages, Nov. 18, 2010.

Author Unknown, "RedEye mini Plug-in Universal Remote Adapter for iPhone, iPod touch and iPad," Amazon.com, 4 pages, date unknown.

Author Unknown, "Re iPhone Universal Remote Control—Infrared Remote Control Accessory for iPhone and iPod touch," http://www.amazon.com/iPhone-Universal-Remote-Control-Accessory/dp/tech-data/B0038Z4 . . . , 2 pages, at least as early as Jul. 15, 2010.

Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.

Author Unknown, "Vyzin Electronics Private Limited launches Vesag Watch," http://www.virtualpressoffice.com/showJointPage.do?page=jp&showId=1544, 5 pages, Jan. 6, 2011.

Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.

IBM, "Additional Functionality Added to Cell Phone via "Learning" Function Button," www.ip.com, 2 pages, Feb. 21, 2007.

Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.

(56) References Cited

OTHER PUBLICATIONS

Rick, "How VESAG Helps Health Conscious Citizens," http://sensetekgroup.com/2010/11/29/wireless-health-monitoring-system/, 2 pages, Nov. 29, 2010.
Sadhu, Rajendra, "How VESAG Helps People Who Want to 'Be There'?," http://ezinearticles.com/?How-Vesag-Helps-People-Who-Want-to-Be-There?&id-5423873, 1 page, Nov. 22, 2010.
Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.
Sherr, Sol, "Input Devices," p. 55, Mar. 1988.
Tran et al., "Universal Programmable Remote Control/Telephone," www.ip.com, 2 pages, May 1, 1992.
International Search Report and Written Opinion, PCT/US2016/012279, 15 pages, dated Jul. 8, 2016.
Author Unknown, "DeskThorityNet, Optical Switch Keyboards," http://deskthority.net/keyboards-f2/optical-switch-keyboards-t1474.html, 22 pages, Jul. 11, 2015.
Epstein et al., "Economical, High-Performance Optical Encoders," Hewlett-Packard Journal, pp. 99-106, Oct. 1988. [text only version].
GreyB, "Google Watch: Convert your arm into a keyboard," http://www.whatafuture.com/2014/02/28/google-smartwatch/#sthash.Yk35cDXK.dpbs, 3 pages, Feb. 28, 2014.
Krishnan et al., "A Miniature Surface Mount Reflective Optical Shaft Encoder," Hewlett-Packard Journal, Article 8, pp. 1-6, Dec. 1996.
Author Unknown, "Desirable Android Wear smartwatch from LG," Gulf News, Dubai, 3 pages, Jan. 30, 2015.
Author Unknown, "Fossil Q ups smartwatch game with handsome design and build," Business Mirror, Makati City, Philippines, 3 pages, Dec. 20, 2016.
Author Unknown, "MyKronoz ZeTime: World's Most Funded Hybrid Smartwatch Raised over $3M on Kickstarter, Running until Apr. 27th," Business Wire, New York, New York, 3 pages, Apr. 21, 2017.
U.S. Appl. No. 15/064,057, filed Mar. 8, 2016, pending.
U.S. Appl. No. 15/210,917, filed Jul. 17, 2015, pending.
U.S. Appl. No. 15/219,253, filed Jul. 25, 2016, pending.
U.S. Appl. No. 15/117,819, filed Aug. 10, 2016, pending.
U.S. Appl. No. 15/261,904, filed Sep. 10, 2016, pending.

\* cited by examiner

COMPRESSIBLE SEAL FOR ROTATABLE AND TRANSLATABLE INPUT MECHANISMS

CROSS-REFERENCE TO RELATED APPLICATION

This application is a nonprovisional patent application of and claims the benefit of U.S. Provisional Patent Application No. 62/129,953, filed Mar. 8, 2015 and titled "Compressible Seal for Rotatable and Translatable Input Mechanisms," the disclosure of which is hereby incorporated herein by reference in its entirety.

FIELD

This disclosure relates generally to rotatable and translatable input mechanisms such as a rotatable and translatable crown mechanism for an electronic device, and more specifically to a compressible seal for a rotatable and translatable input mechanism that forms a barrier against contaminants such as dust and a concealing surface that obscures internal components.

BACKGROUND

Many types of electronic or other devices such as small form factor devices utilize input devices to receive user input. Such devices may be waterproofed and/or otherwise sealed. However, input devices included in such devices may form weak points for such waterproofing and/or other sealing. Further, such input devices may disrupt the appearance of the devices.

SUMMARY

The present disclosure details systems and apparatuses related to input mechanisms that are operable to rotate and translate in order to provide input.

In one embodiment, an electronic device may have a housing and an associated rotatable and translatable input mechanism. The housing may define an aperture through which a shaft of the rotatable and translatable input mechanism extends. The input mechanism may also have a manipulation structure coupled to the shaft. The manipulation structure may be manipulated to rotationally and/or translationally move the shaft to provide one or more types of input to the electronic device.

A compressible seal may be positioned in a gap between the housing and the rotatable and translatable input mechanism. The compressible seal may resist and/or prevent passage of contaminants into the aperture and/or obscure one or more internal components. The compressible seal may be configured to collapse or bend when the rotatable and translatable member translates.

In various embodiments, an input mechanism assembly may include a housing having an aperture. The input mechanism assembly may also include a rotatable and translatable member having a shaft positioned at least partially within the aperture and a manipulation structure coupled to the shaft and separated from the housing by a gap. The input mechanism assembly may additionally include a compressible seal positioned in the gap that resists passage of contaminants into the aperture and is configured to collapse when the rotatable and translatable member translates to decrease the gap between the manipulation structure and the housing.

In some embodiments, a wearable electronic device may include a body having an aperture. The wearable electronic device may also include a crown having a knob coupled to a stem that is positioned at least partially within the aperture. The crown may be operable to rotate and translate with respect to the body. The wearable electronic device may further include a tactile structure connected to the crown that is actuatable by translation of the crown and an elastomer Y-ring positioned between the crown and the body configured to bend when the crown translates to move the knob toward the housing. The elastomer Y-ring may obscure at least one component with a different visual appearance than the knob.

In one or more embodiments, a system may include a wearable device having an enclosure or housing and a collar coupled to an aperture of the enclosure. The collar may have an outside and an inside. The system may further include an input mechanism moveably connected to the collar having a first portion and a second portion. The system may also include a compressible structure positioned between the enclosure and the input mechanism. The first portion may be moveably coupled to the outside of the collar via at least one bushing and the second portion may be positioned within the inside of the collar such that the input mechanism is operable to rotate and translate with respect to the collar.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems and apparatuses that embody various elements of the present disclosure. However, it should be understood that the described embodiments may be practiced in a variety of forms in addition to those described herein.

The present disclosure details systems and apparatuses related to input mechanisms that are operable to rotate and translate in order to provide input. Various embodiments may provide waterproofing and/or other sealing for these input mechanisms. One or more embodiments may affect appearances of these input mechanisms.

In one embodiment electronic device may have a housing and an associated rotatable and translatable input mechanism. The housing may define an aperture through which a shaft of the rotatable and translatable input mechanism extends. The input mechanism may also have a manipulation structure coupled to the shaft. The manipulation structure may be manipulated to rotationally and/or translationally move the shaft to provide one or more types of input to the electronic device.

A compressible seal may be positioned in a gap between the housing and the rotatable and translatable input mechanism. The compressible seal may resist and/or prevent passage of contaminants into the aperture and/or obscure one or more internal components. The compressible seal may be configured to collapse or bend when the rotatable and translatable member translates.

Figure 1:
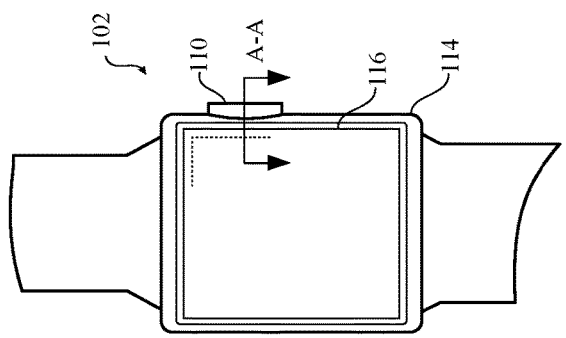
FIG. 1 is an isometric view of system including an electronic device and a rotatable and translatable input mechanism assembly.

FIG. 1 is a top plan view of an electronic device 102 having a body, housing, or other enclosure or housing 114 and a rotatable and translatable input mechanism assembly 110 (such as a crown). As the input mechanism assembly 110 is rotatable and translatable, the input mechanism assembly 110 may be operable to receive multiple kinds of input for the electronic device 102. For example, the input mechanism assembly 110 may be operable to receive button input and rotating knob input.

Figure 3:
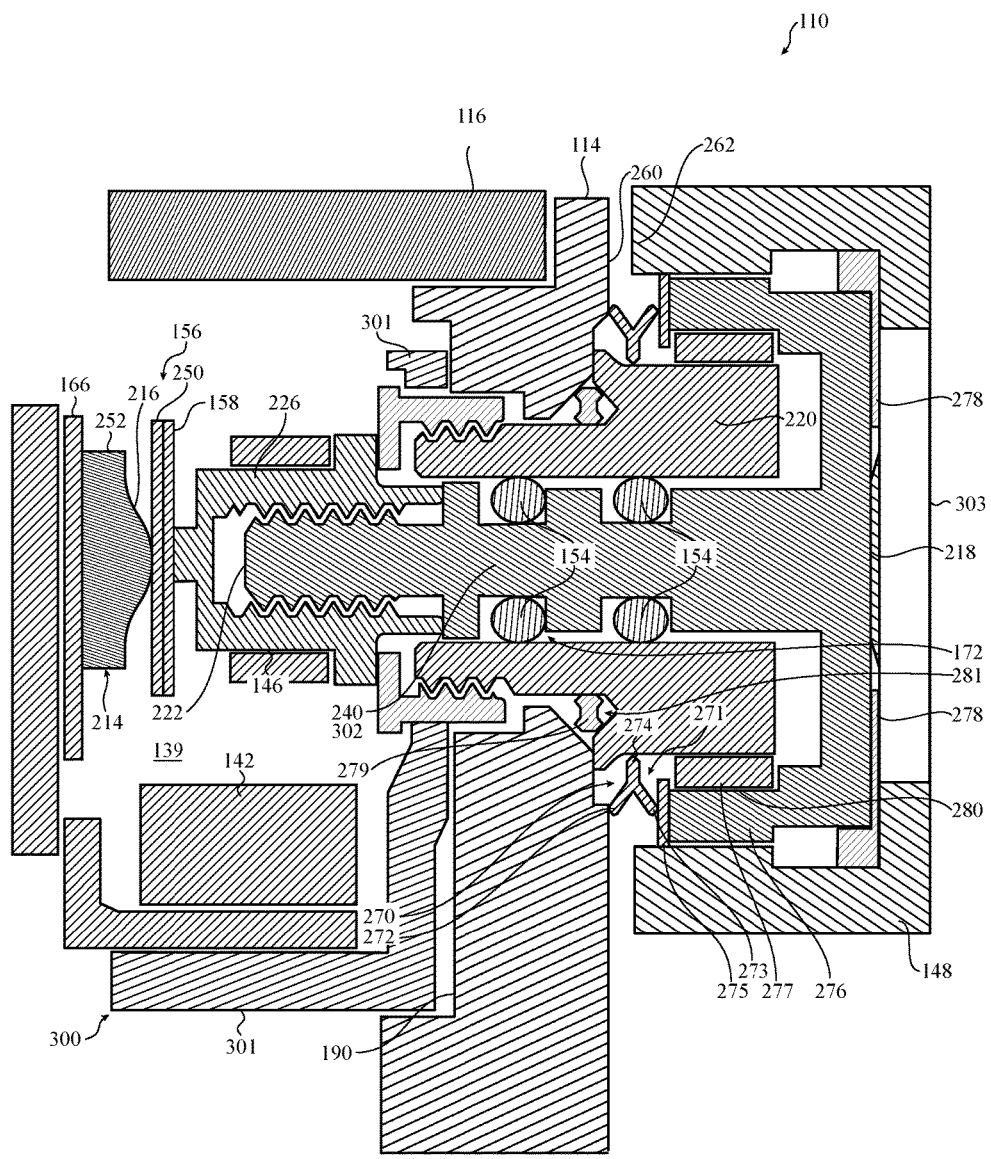
FIG. 3 is a cross-section view of the electronic device of FIG. 1 taken along line A-A in FIG. 1.

A compressible seal or structure (one example of which is shown in FIG. 3) may be positioned between the input mechanism assembly 110 and the enclosure 114 that resists passage of contaminants into internal portions of the input mechanism assembly 110 and/or the electronic device 102. Portions of the compressible seal may collapse and/or bend to allow translational movement of the input mechanism assembly 110. The compressible seal may be configured to obscure and/or otherwise block from view internal components of the input mechanism assembly 110 and/or the electronic device 102. Such a configuration may allow use of internal components formed of different materials and/or with different surfaces than the enclosure 114 and/or external portions of the input mechanism assembly 110 while preventing the internal components from being visible from outside the housing 114.

The electronic device 102 is shown in FIG. 1 as a wearable electronic device having a display 116. However, it is understood that this is an example. In various implementations, the electronic device may be any kind of electronic device that utilizes a rotatable and translatable input mechanism. Sample electronic devices include a laptop computer, a desktop computer, a mobile computer, a smart phone, a tablet computer, a fitness monitor, a personal media player, a display, audiovisual equipment, and so on.

Figure 2:
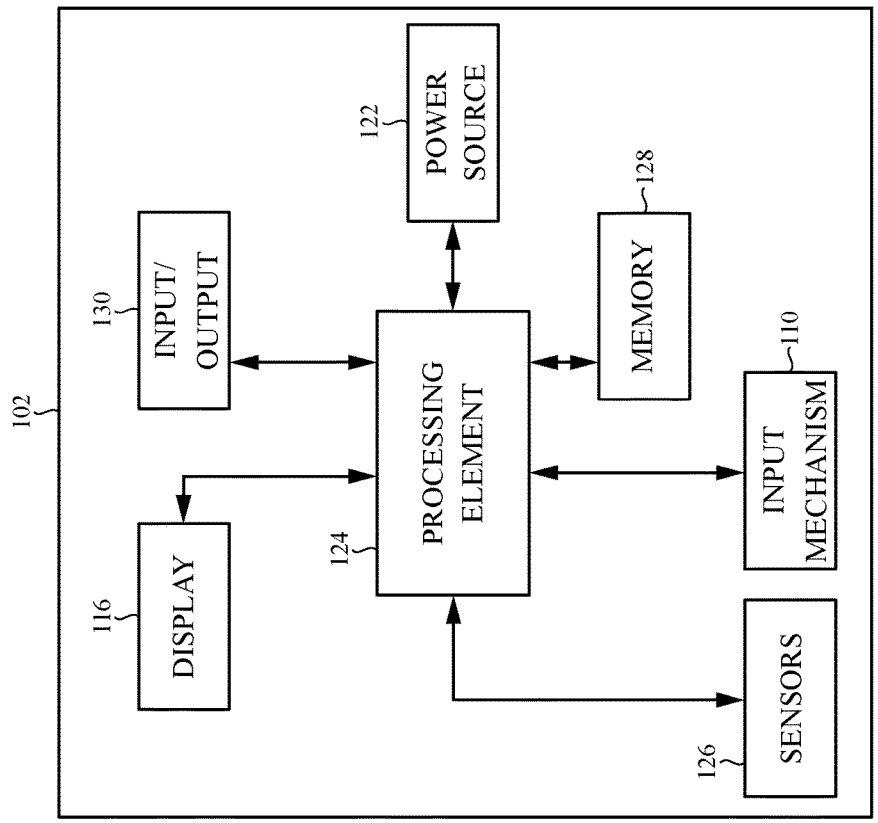
FIG. 2 is a simplified block diagram illustrating functional relationships of example components that may be utilized in some implementations of the electronic device of FIG. 1.

FIG. 2 is a simplified block diagram illustrating functional relationships of example components that may be utilized in some implementations of the electronic device 102 of FIG. 1. As shown, the electronic device 102 may include a number of interconnected components, such as one or more processing elements 124, one or more input/output components 130 (which may include one or more communication components), one or more power sources 122 (such as one or more batteries), one or more sensors 126, one or more input components such as the input mechanism assembly 110, one or more displays 116, and one or more memories 128 and/or other non-transitory storage components. The processing element 124 may execute instructions stored in the memory 128 and/or other non-transitory storage components to perform various functions. For example, the processing element 124 may receive input via the input mechanism assembly 110 (and/or other components such as the display 116 in implementations where the display 116 is a touch display), provide output via the display 116 and/or the input/output components 130, transmit one or more communications via the input/output components 130, and so on.

FIG. 3 is a partial cross-section view of the electronic device 102 taken along line A-A in FIG. 1. As illustrated, the input mechanism assembly 110 may include a cap 303 (such as zirconia, sapphire, and so on) fitted into an aperture of a manipulation structure 148 (such as a knob that may be made of aluminum, gold, or other material with a variety of surface finishes such as matte, polished, and so on). The cap 303 may be fitted into the manipulation structure 148 via an adhesive mechanism 278 such as heat activated film, pressure sensitive adhesive, and so on. A coupling 218 (which may be formed of a material such as titanium) may be attached into a cavity or recess of the manipulation structure 148. The coupling 218 may include outer arms 276 and a stem or shaft 240. The input mechanism assembly 110 may further include an extender 226 (which may be formed of a material such as cobalt chrome) that interlocks with an end 222 of the shaft 240. Movement of the shaft 240 may thus also move the extender 226.

Although the manipulation structure 148 is illustrated in FIG. 3 as including the cap 303, it is understood that this is an example. In some implementations, the coupling 218 may screw into threads of the cavity or recess (not shown) and be fixed in place by glue and/or other adhesive mechanism.

As shown, the enclosure 114 may define an input mechanism aperture 172 that extends from an outer surface 260 of the enclosure 114 to an interior surface 190. One or more portions of the input mechanism assembly 110 may be positioned in the input mechanism aperture 172 such that the input mechanism assembly 110 is able to rotate and translate with respect to the enclosure or housing 114.

As shown, a collar 220 may abut enclosure 114, extend through the input mechanism aperture 172 and interlock with a bracket 302. In some embodiments, one or both of the collar 220 and the bracket 302 may be formed from cobalt chrome. A gasket 279 may be positioned between the enclosure 114 and the collar 220 and may compress when the collar 220 is interlocked with the bracket 302. The gasket 279 may have one or more external scallops or indentations 281 to permit the gasket 279 to expand when a compressive force is exerted on the gasket, as may occur when the collar 220 is screwed into or otherwise moved near the bracket 302.

When not under external force, the gasket 279 may be I-shaped in cross-section. The indentation(s) 281 in the sidewall gasket 279 permit the interior of the gasket to expand outward under the aforementioned compressive force. This, in turn, may permit the I-shaped gasket 279 to be used in uneven-shaped or relatively small that may be unsuitable for an O-ring having a diameter similar to, or the same as, the height of the gasket 279. Such an O-ring, when under compressive force, may be unable to expand into the limited space available and thus may prevent the collar 220 and bracket 302 from securely locking together.

The outer arms 276 of the coupling may positioned around an outside of the collar 220 and the shaft 240 may be positioned at least partially within an inside of the collar 220. As such, the input mechanism assembly 110 may be moveably connected within and around the inside and the outside of the collar 220 so as to be rotationally and translationally moveable.

A compressible seal 271 may be positioned between one or more portions of the input mechanism assembly 110 and the enclosure 114. The compressible seal 271 may resist or prevent passage of contaminants (e.g., dust, particles, and/or liquids) into a gap 270 between the input mechanism assembly 110 and the housing 114. The compressible seal 271 may collapse and/or bend to allow translational movement of the input mechanism assembly 110.

Figure 4:
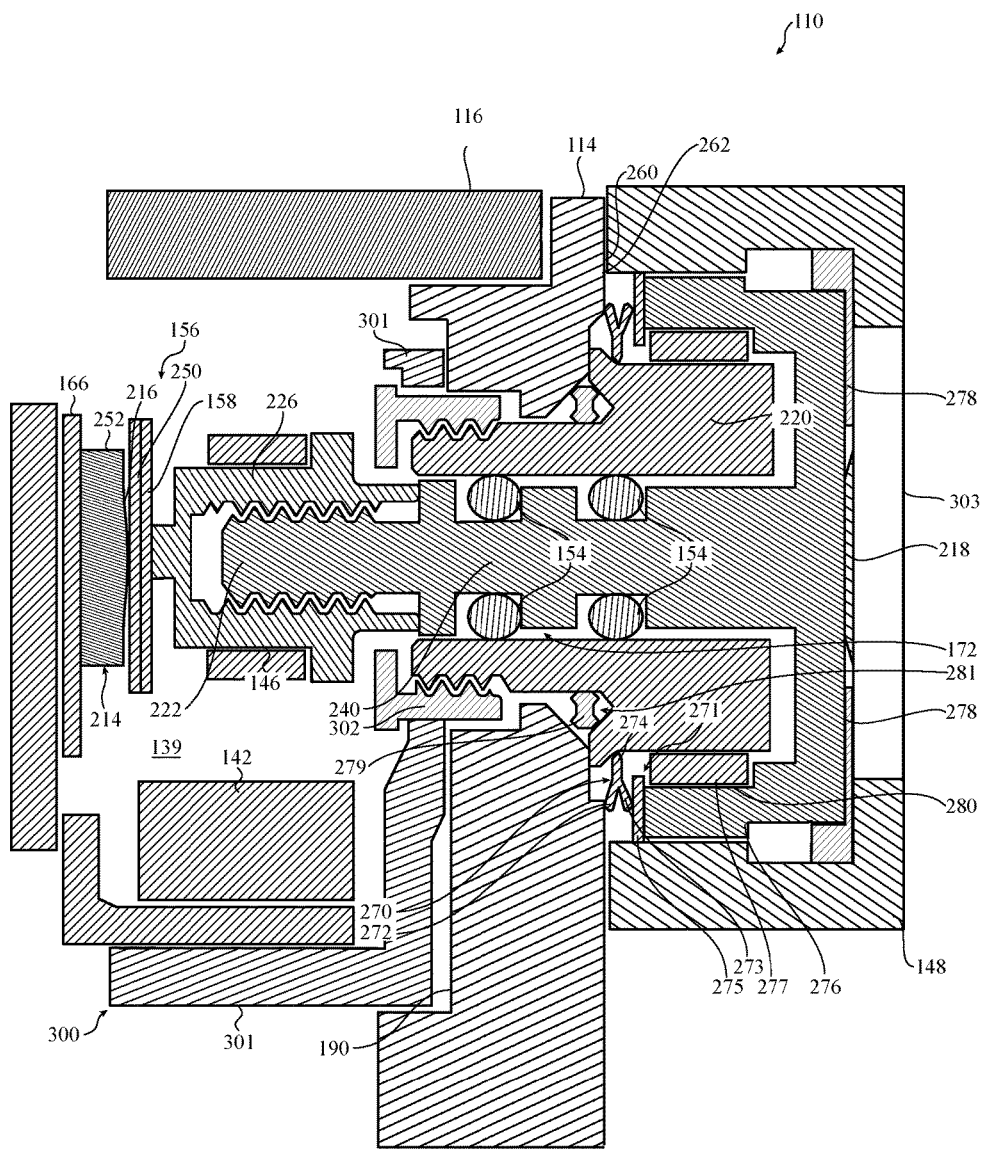
FIG. 4 illustrates the view of FIG. 3 upon a user input force being applied to the manipulation structure of the input mechanism assembly.

FIG. 4 is a cross-sectional view similar to that of FIG. 3, but showing the input mechanism assembly 110 under external force such as a user pressing on the cap 303. As show, the external force moves the manipulation structure 148 closer to the enclosure 114. The compressible seal may be configured to obscure and/or otherwise block from view internal components of the input mechanism assembly 110 and/or the electronic device 102.

A bushing 277 may be connected to the outer arm 276 of the coupling and be positioned adjacent a portion of the seal 271. The bushing 277 may cooperate with an outside of the collar 220 to allow the outer arms 276 to rotate around and translate along the collar 220. Thus, the bushing 277 may bear the majority of the stress of rotation and/or translation of the input mechanism assembly 110. As shown, the bushing 277 may be set into a recess 280 of the coupling arm 276 and at least partially covered by a plate 275 (such as a washer made of titanium or other material that may be welded or otherwise affixed to the coupling arm 276). These features may reduce separation of the bushing 277 caused by stress during movement and/or movement of the bushing 277.

In some implementations, the bushing 277 may be formed of a material such as high molecular weight polyethylene and the collar 220 may have a polished and/or coated surface so that friction and/or stress is minimized when the bushing 277 moves along and/or around the collar 220. As the compressible seal 271 may obscure the collar 220, the polished surface of the collar 220 may not be externally visible and may not visually distract from surfaces of the manipulation structure 148 and/or the enclosure 114.

One or more gaskets 154 (such as one or more O-rings) may be positioned between the shaft 240 and the collar 220. The gaskets 154 may cooperate with an inside of the collar 220 to allow the shaft 240 to rotate and translate within the collar 220. The inside of the collar 220 may also be coated and/or polished to facilitate movement of the gaskets 154 to better allow the shaft 240 to rotate and translate within the collar 220. Such gaskets 154 may also form a barrier against entry of contaminants such as dust, dirt, and/or liquid into the housing 114, and may be at least partially compressed when the shaft 240 is affixed to an extender 226, as described below.

As shown, the gaskets 154 may be positioned in one or more indentations or annular grooves of the shaft 240. Such indentations may operate to prevent movement of the gaskets 154 along the length of the shaft 240 during movement of the shaft 240. Such indentations may also allow the shaft 240 to have as wide a diameter as possible while allowing room for the gaskets 154. In some embodiments, the indentations have rounded edges. In other implementations, the indentations may be further rounded and/or otherwise shaped to more closely conform to the shape of the gaskets 154 in order to maximize the size of the shaft 240 while still allowing room for the gaskets 154. However, in still other implementations the indentations may be square and/or otherwise shaped without rounded edges.

Two gaskets 154 are shown. However, it is understood that this is an example and that different numbers of gaskets 154 may be utilized in various implementations. One gasket 154 may be utilized to allow rotation and translation of the shaft 240 as well as forming a barrier against entry of contaminants. However, multiple gaskets 154 may be utilized in other embodiments in order to provide stability for the shaft 240 during rotation and/or translation.

The extender 226 may be operable to transfer translational movement of the shaft 240 to a tactile structure 214 mounted on a substrate 166 via a shear plate 156. Translational movement of the shaft 240 that moves the manipulation structure 148 closer to the enclosure 114 may activate the tactile structure 214 via the extender 226 and the shear plate 156.

The extender 226 may be flanged as shown and/or otherwise configured such that the extender 226 is unable to pass through the input mechanism aperture 172. This may allow the extender 226 to prevent the input mechanism assembly 110 from being removed from the electronic device 102 after the extender 226 and the shaft 240 are attached. Further, the extender 226 may have a larger area than the shaft 240. This may provide the extender 226 with a larger surface area than the shaft 240 for contacting the shear plate 156 and/or for other purposes.

In some implementations, the tactile structure 214 may include a switch 252 and activation of the switch 252 may be interpreted as input related to translational movement of the input mechanism assembly 110 by the electronic device 102. Regardless whether or not the tactile structure 214 includes the switch 252, actuation of the tactile structure 214 may be operable to transfer a tactile output to the manipulation structure 148 via the shear plate 156, the extender 226, and the shaft 240. For example, the tactile structure 214 may include a dome 216. The dome 216 may contact the shear plate 156. Activation of the tactile structure 214 by a force causing translational movement of the shaft 240 that moves the manipulation structure 148 closer to the enclosure 114 may compress the dome 216 (as shown in FIG. 4) and transfer a tactile sensation of a 'button click' that may be felt via the manipulation structure 148. Compression of the dome 216 may also produce an audible output in some implementations. When the force is no longer exerted, the dome 216 may decompress, causing translational movement of the shaft 240 that, in turn, moves the manipulation structure 148 away from the enclosure 114 as shown in FIG. 3.

The shear plate 156 may include a shim 250 that shields the tactile structure 214 from stress or damage related to movement of the extender 226. In some implementations, a contact plate 158 may be connected to the shim 250 that maintains electrical connection to the extender 226 during rotation and/or translation. This contact plate 158 may form an electrical pathway between the electronic device 102 and the input mechanism assembly 110, such as in implementations where an electrical connection may be formed between a user and the electronic device 102 by the user touching the manipulation structure 148.

One or more trackable elements 146 that may be detected by one or more sensing elements 142 may be utilized in various implementations. As shown, in some implementations (such as the embodiment of FIG. 9) the trackable elements 146 may be formed on a surface of the extender 226. In other implementations, the trackable element 146 may be a separate component coupled to the extender 226. Typically, as the shaft and collar rotate, so too does the trackable element rotate.

Movement of the trackable element 146 that is detected by the sensing element 142 may be interpreted as an input by the electronic device 102. Such movement of the trackable element 146 may correspond to rotation and/or translation of the extender 226 and may be interpreted as rotational and/or translational input accordingly. Some embodiments may configure the trackable element such that the sensing element may detect rotational motion and input, while others may configure the trackable element 146 to permit detection of translational motion and input. Still others may configure the trackable element 146 to permit detection of both types of motion and/or input.

For example, the trackable element 146 may be a magnetic element. In such an example, the sensing element 142 may be a magnetic field sensor such as a Hall effect sensor.

By way of another example, the trackable element 146 may be optically sensed. The trackable element 146 may be or include a pattern, such as a series, set or other pattern of light and dark marks, stripes, scallops, indentations, or the like, or areas of varying reflectance, polish, and so on and the sensing element 142 may receive light generated by the sensing element 142 and/or another light source and reflected off the trackable element 146. The reflected light may vary with the pattern of the trackable element 146, such that the reflected light may be sensed and the pattern of the trackable element 146 on which the light impinged may be determined. Thus, if the pattern of the trackable element 146 is sufficiently unique along its surface and/or circumference, rotational and/or translational movement of the trackable element 146 and thus input corresponding thereto may be detected by the sensing element 142.

In some implementations, input related to both rotational and translational movement of the input mechanism assembly 110 may be detected by the sensing element 142. In other implementations, input related to rotational movement of the input mechanism assembly 110 may be detected by the sensing element 142 and input related to translational movement of the input mechanism assembly 110 may be detected by a combination of the sensing element 142 and activation of the tactile structure 214. In still other implementations, input related to rotational movement of the input mechanism assembly 110 may be detected by the sensing element 142 and input related to translational movement of the input mechanism assembly 110 may be detected by activation of the tactile structure 214. Various configurations are possible and contemplated without departing from the scope of the present disclosure.

The compressible seal 271 will now be discussed in more detail. As discussed above, the compressible seal 271 (which may be formed by compression molding and/or another process of a material such as an elastomer, silicone, polyurethane, hydrogenated nitrile butadiene rubber, a fluoroelastomer such as one marketed under the brand name Viton™, and/or other such material) may be operable to collapse and/or bend in order to allow translational movement of the input mechanism assembly 110. In some embodiments, the compressible seal 271 may be formed from another suitable elastomer, polymer, or metal. As one non-limiting example, the compressible seal could be formed from cobalt-chrome or titanium sheet metal, and may be about 0.01 mm thick. FIG. 4 illustrates translational movement of the input mechanism assembly 110 that moves the manipulation structure 148 closer to the enclosure 114, causing the compressible seal 271 to collapse.

Figure 10:
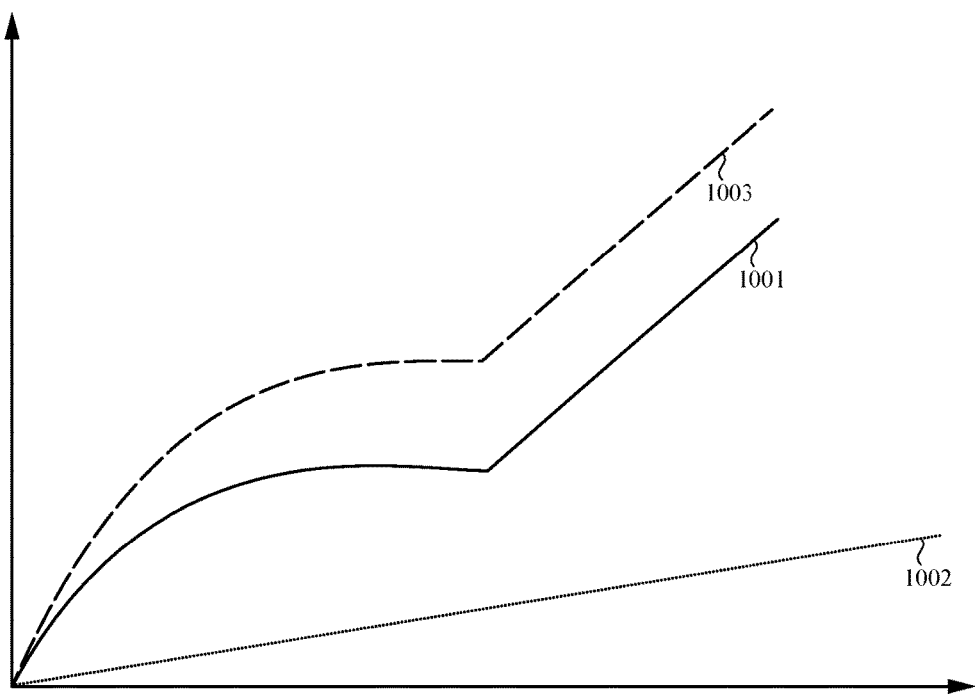
FIG. 10 illustrates force curves corresponding to actuation of the tactile structure, compression of the compressible seal, and the combination of actuation of the tactile structure and compression of the compressible seal.

As opposed to a sealing member such as an O-ring that compresses under force but does not collapse or bend, the compressible seal 271 may not change the shape of the force curve corresponding to activation of the tactile structure 214. FIG. 10 is a graph illustrating a force curve 1001 corresponding to actuation of the tactile structure 214, a force curve 1002 corresponding to compression of the compressible seal 271, and a force curve 1003 corresponding to the combination of actuation of the tactile structure 214 and compression of the compressible seal 271. As illustrated, compression of the compressible seal 271 may be a linear slope of relatively little force compared to the force curve 1002. Though combining the force curves 1001 and 1002 does change the magnitude of the force curve 1003 by the additional force related to compressing the compressible seal 271, the shape of the force curves 1002 and 1003 are unchanged.

The compressible seal 271 may allow rotation of the input mechanism assembly 110. In some implementations, the compressible seal 271 may be freely spinning or moving, unfixed from either the enclosure 114 or the input mechanism assembly 110. As such, the compressible seal 271 may move with rotation of the input mechanism assembly 110 if the friction between the input mechanism assembly 110 and the compressible seal 271 is sufficient to move the compressible seal 271 and/or to overcome friction between the compressible seal 271 and the enclosure 114. Thus, rotation of the input mechanism assembly 110 may or may not be transferred to the compressible seal 271. In other implementations, the compressible seal 271 may be fixed to the enclosure 114 or one or more portions of the input mechanism assembly 110.

As discussed above, the compressible seal 271 may function as a barrier against entry of contaminants into the input mechanism assembly 110 (such as into spaces between the bushing 277 and the collar 220) and/or the electronic device 102. The compressible seal 271 may resist passage of dirt, dust, and/or other particles. The compressible seal 271 may also resist passage of liquid absent hydrostatic pressure (i.e. unpressurized liquid). In various implementations, the compressible seal 271 may still allow passage of pressurized liquid. As the compressible seal 271 allows the input mechanism assembly 110 to rotate and/or translate, the compressible seal 271 may resist passage of contaminants while the input mechanism assembly 110 is rotating and/or translating.

Thus, the compressible seal 271 may provide a first barrier against entry of contaminants such as dust and unpressurized liquid into the input mechanism assembly 110. The gaskets 154 may form a second barrier against entry of contaminants such as pressurized liquid into the enclosure 114. As such, the gaskets 154 may form a more comprehensive barrier than the compressible seal 271.

As also discussed above, the compressible seal 271 may be configured to perform a concealing function. The compressible seal 271 may be configured to obscure and/or otherwise block various components from view. Such components may be visually distracting and/or be formed of different materials and/or with different finishes than the enclosure 114 and/or the manipulation structure 148.

For example, the compressible seal 271 may block the collar 220 from view. This may allow the collar 220 to be formed of a polished metal without allowing such polished metal to be visible from outside the electronic device 102.

In some cases, the compressible seal 271 may be configured with optical properties that trap light and/or are otherwise not visually distracting. For example, a compressible seal 271 formed of a fluoroelastomer and/or other elastomer may be configured with a matte (as opposed to a glossy and/or otherwise reflective) surface and may be colored a dark color (such as a dark grey). A matte finish and a dark color may function to trap light so that the compressible seal 271 is not visually distracting and visual focus is instead drawn to the display 116, the enclosure 114, and/or the manipulation structure 148.

As shown, the compressible seal 271 may be a Y-ring with a first arm 272 and a second arm 273 positioned obliquely with respect to each other. The first arm 272 may have a first end that contacts the enclosure 114 and a second end that connects to the second arm 273 via a base portion 274. The second arm 273 may have a third end that contacts the input mechanism assembly 110 (shown as contacting the plate 275) and a fourth end that connects to the first arm 272 via the base portion 274. As shown in FIGS. 3-4, translational movement of the input mechanism assembly 110 that moves the manipulation structure 148 closer to the enclosure 114 (decreasing a gap between the manipulation structure 148 and the enclosure 114) may cause the first and second arms 272 and 273 to move toward each other.

However, it is understood that this is an example. In other implementations, the compressible seal 271 may have a shape other than a Y shape, such as an X shape, a U shape, a V shape, and/or other shape. For example, FIG. 5 illustrates a first alternative example of the electronic device 102 of FIG. 3.

Figure 5:
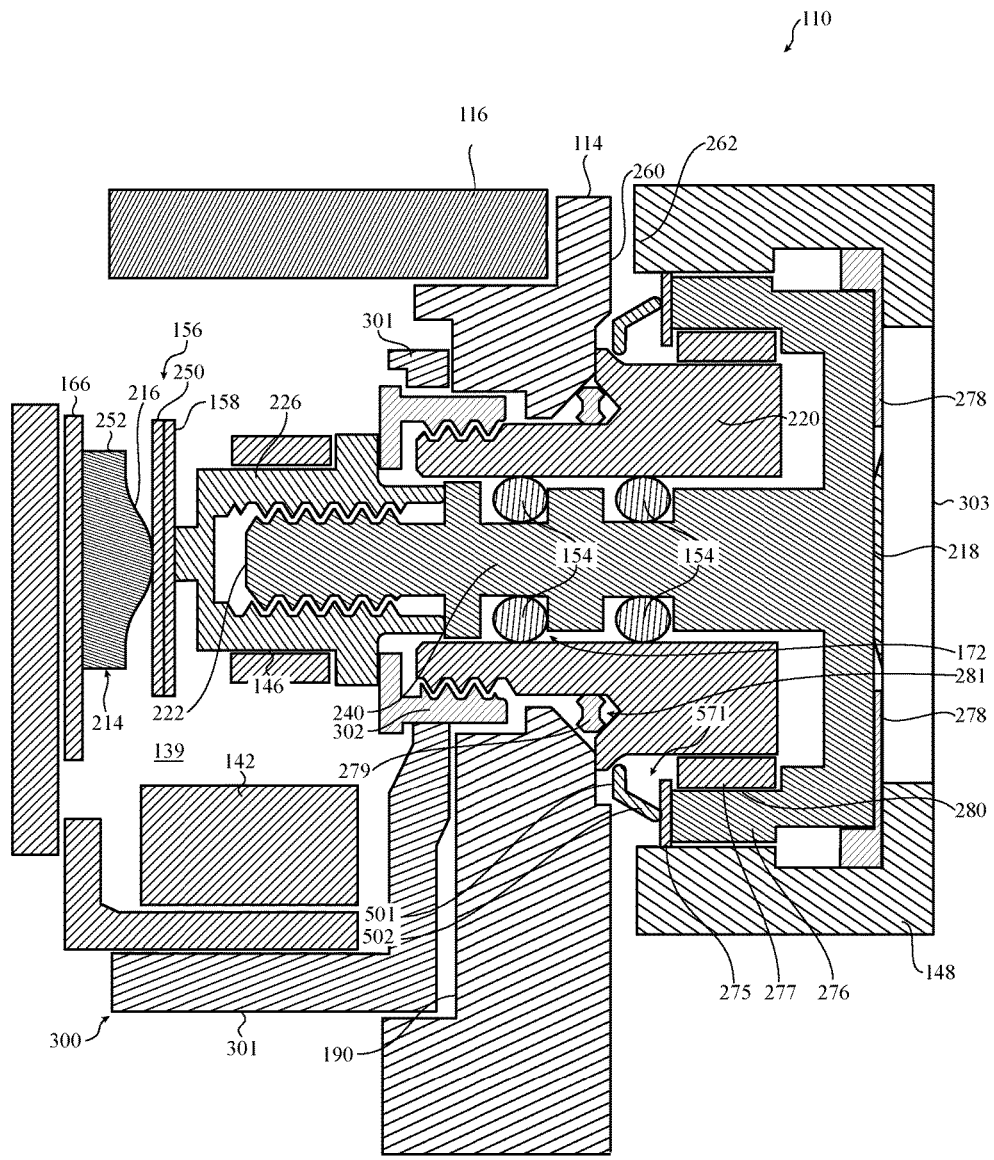
FIG. 5 illustrates another implementation of the electronic device of FIG. 3.
Figure 6:
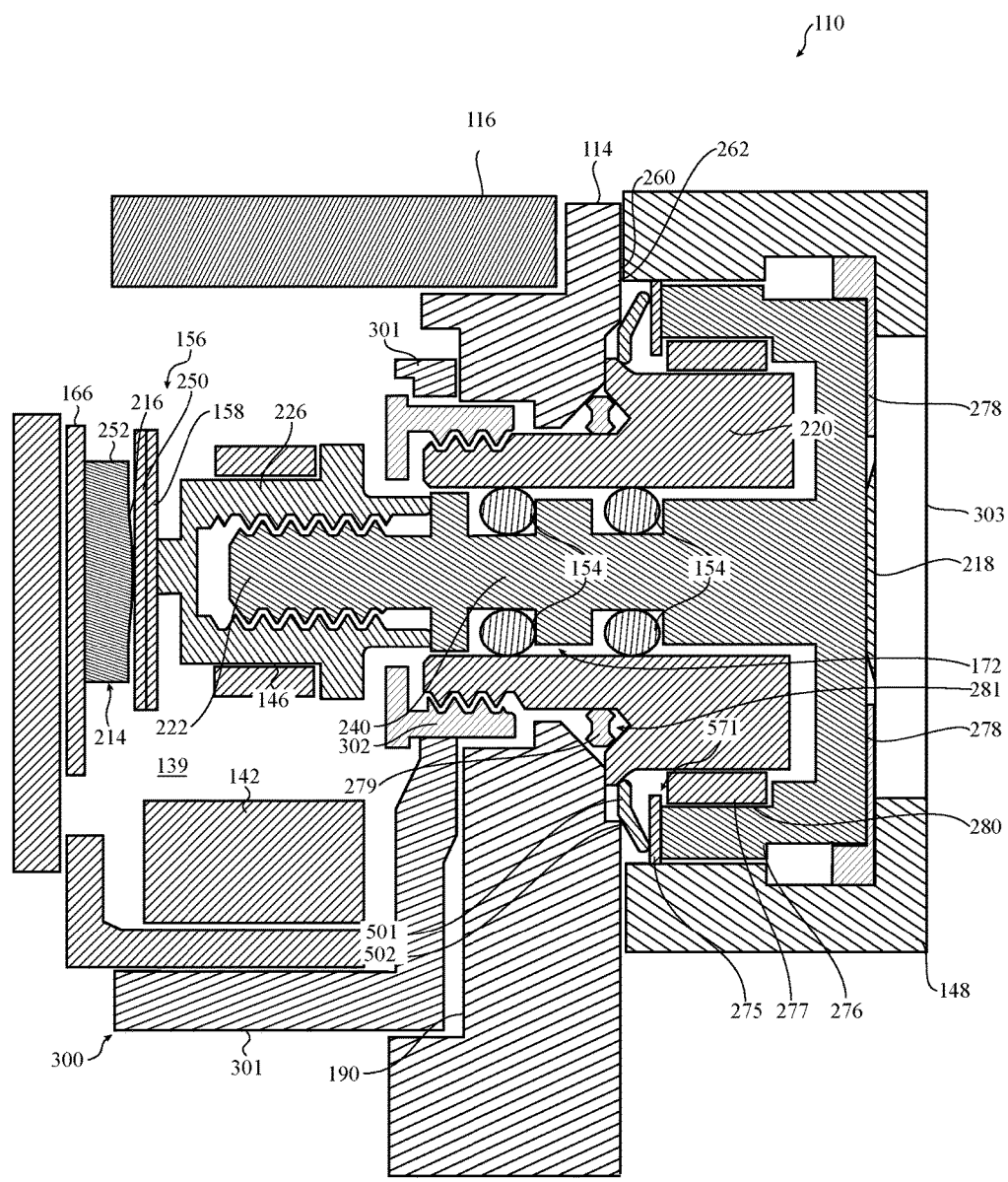
FIG. 6 illustrates the view of FIG. 5 upon a user input force being applied to the manipulation structure of the input mechanism assembly.

As illustrated in FIG. 5, a compressible seal 571 may be positioned in a space between the enclosure 114 and the input mechanism assembly 110. The compressible seal 571 may include connected first and second portions 501 and 502 that are angled with respect to each other. The second portion 502 may contact the plate 275 and/or other portion of the input mechanism assembly 110. FIG. 6 illustrates bending of the first and second portions 501 and 502 in response to translational movement of the input mechanism assembly 110 closer to the enclosure 114. As such, the compressible seal 571 may form a barrier against entry of contaminants into the input mechanism assembly 110 and may obscure components of the input mechanism assembly 110 such as the collar 220 even though the compressible seal 571 does not contact the enclosure 114. The compressible seal 571 may still allow rotational and translational movement of the input mechanism assembly 110 even though the compressible seal 571 does not contact the enclosure 114.

Figure 7:
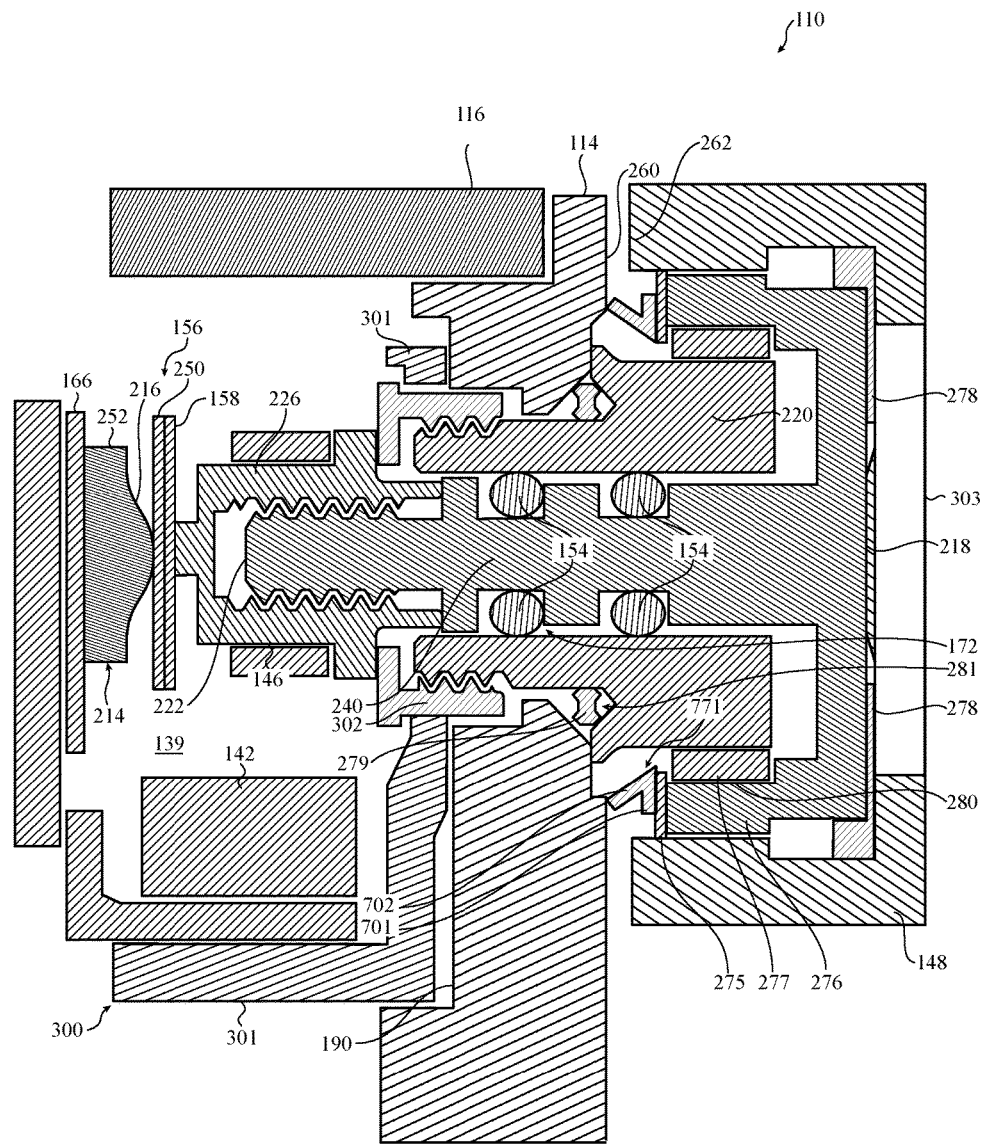
FIG. 7 illustrates still another implementation of the electronic device of FIG. 3.
Figure 8:
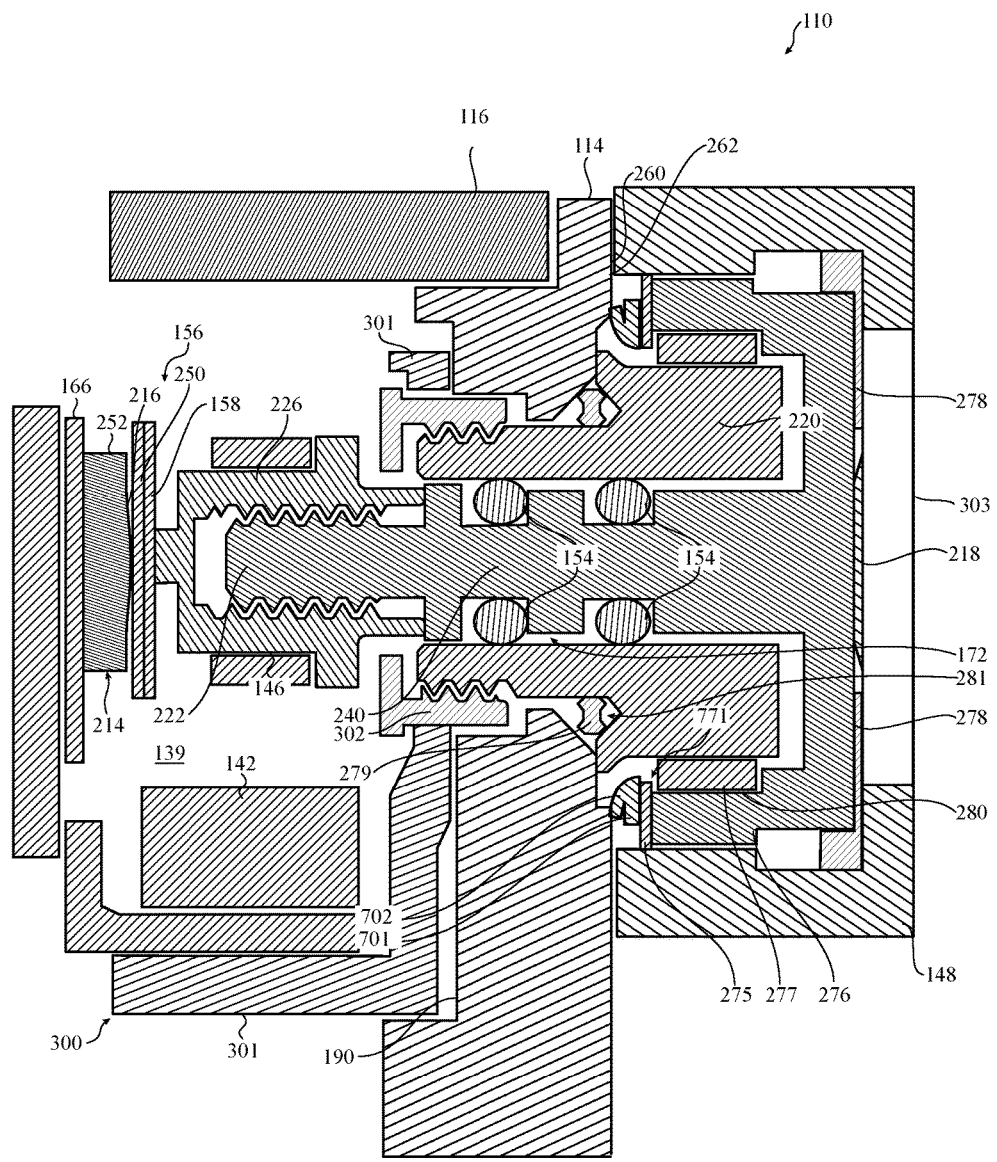
FIG. 8 illustrates the view of FIG. 7 upon a user input force being applied to the manipulation structure of the input mechanism assembly.

By way of another example, FIG. 7 illustrates a second alternative example of the electronic device 102 of FIG. 3. As illustrated, a V shaped compressible seal 771 may be between the enclosure 114 and the input mechanism assembly 110. The compressible seal 771 may include a first portion 701 that attaches or otherwise contacts the plate 275 and a second portion 702 that is angularly positioned with respect to the first portion 701 to contact the enclosure 114. FIG. 8 illustrates the compressible seal 771 in on itself, moving the second portion 702 closer to the first portion 701, in response to translational movement of the input mechanism assembly 110 that moves the manipulation structure 148 closer to the enclosure 114.

Figure 9:
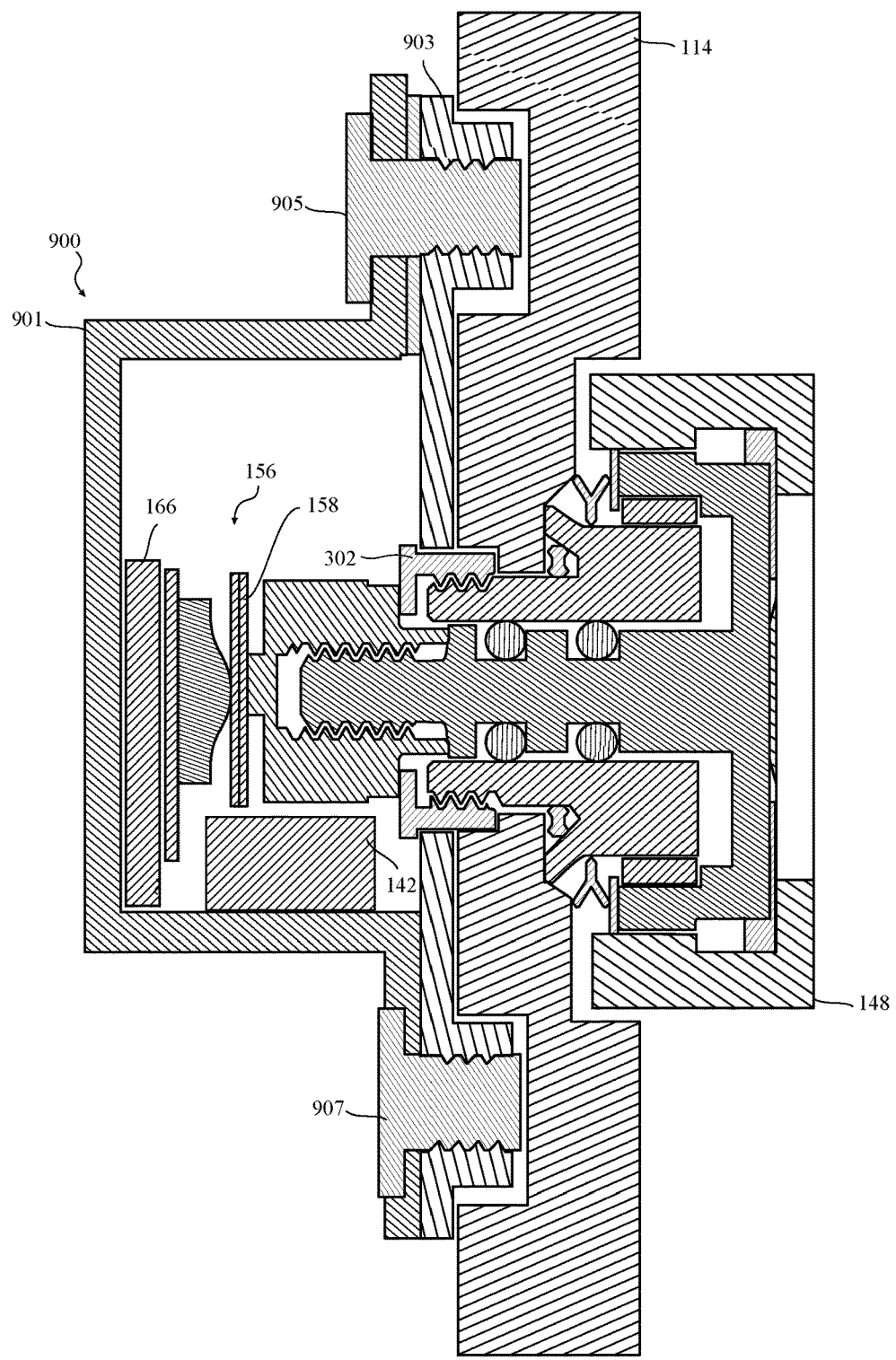
FIG. 9 illustrates still another implementation of the electronic device of FIG. 3.

FIG. 9 illustrates yet another sample embodiment of a rotatable and translatable input mechanism. The general structure of the mechanism is similar to, or the same as, that described with respect to prior embodiments and so discussion of like or similar parts is omitted with respect to this figure.

Here, however, the switch 252, its substrate 166, the shear plate 156 and contact plate 158, may be configured as part of a modular assembly 900. In some embodiments, the sensing element 142 may be a component of the modular structure 900 as well, although this is not necessarily required. Likewise, any flex or other electrical connector associated with any of the components of the modular structure 900 may also be included within the structure as an option.

Generally, the modular assembly 900 may be contained within a module wall 901. The various elements of the assembly 900 may be affixed to the modular wall 901 or otherwise contained therein in a relatively stable fashion. During assembly of a sample electronic device 102, the modular assembly 900 may be placed within a cavity formed by the housing 114. A support structure, such as a plate 903, may be affixed to an interior of the housing 114. One or more screws 905, 907 or other suitable fastener, adhesive, weld or bond may affix the modular wall 901 (and thus the assembly 900) to the support structure 903 and ultimately the housing 114. In some embodiments the sensing element 142 may be positioned prior to affixing the modular assembly 901 to the support structure 903. In still other embodiments the support structure 903 may be held fixedly in place against the housing 114 by the bracket 302.

Returning to FIG. 3, in some implementations, a module 300 may be provided that includes multiple components joined into a structure such as a frame 301, the bracket 302 (which may be attached to the frame 301 such as screwed in via threads of the bracket 302 and the frame 301 not shown), the extender 226, the shear plate 156, the substrate 166, the sensing element 142, the tactile structure 214, and so on. The module 300 may be placed into the enclosure 114. The tactile structure 214 and the shear plate 156 may bias the extender 226 toward the bracket 302, holding the extender 226 in place.

The collar 220 may be inserted into the input mechanism aperture 172 with the gasket 279 in between, attaching the collar 220 to the bracket 302 (such as by screwing the collar 220 into the bracket 302 via interlocking threads) and causing the gasket 279 to compress and bulge into the indentations 281.

The coupling 218 with the manipulation structure 148 may be placed over the collar 220, positioning the compressible seal 271 between the enclosure 114 and the input mechanism assembly 110, such that the shaft 240 is inserted into the collar 220. The end 222 may be inserted into and attached to the extender 226 (such as screwed in via interlocking threads). As shown, the end 222 may have a smaller diameter than the rest of the shaft 240 such that the extender 226 braces against the shaft 240 when the end 222 is positioned within the extender 226.

Although a particular method of assembly has been described above, it is understood that this is an example. In various implementations, various configurations of the same, similar, and/or different components may be assembled in a variety of orders and ways without departing from the scope of the present disclosure.

As described above an illustrated in the accompanying figures, the present disclosure systems and apparatuses related to input mechanisms that are operable to rotate and translate. An electronic device may have a housing and a rotatable and translatable input mechanism. The housing may have an aperture and the rotatable and translatable input mechanism may have a shaft positioned at least partially within the aperture and a manipulation structure coupled to the shaft. The manipulation structure may be manipulated to rotationally and translationally move the shaft to provide rotational and translational input to the electronic device. A compressible seal may be positioned in a gap between the housing and the rotatable and translatable input mechanism. The compressible seal may resist and/or prevent passage of contaminants into the aperture and/or obscure one or more internal components. The compressible seal may be configured to collapse or bend when the rotatable and translatable member translates.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

I claim:

1. An input mechanism assembly for an electronic device, comprising:
    a rotatable and translatable member comprising:
        a shaft positioned at least partially within an aperture of a housing; and
        a manipulation structure coupled to the shaft and separated from the housing by a gap; and
    a compressible seal positioned in the gap that resists passage of contaminants into the aperture and is configured to collapse when the rotatable and translatable member translates; wherein:
    rotation of the rotatable and translatable member generates a first input to the electronic device;
    translation of the rotatable and translatable member generates a second input to the electronic device;
    the compressible seal comprises first and second arms connected at a base portion and separated by a space to define an arm angle;
    the first arm contacts the housing;
    the second arm contacts the rotatable and translatable input member; and
    the first and second arms are operable to pivot when the rotatable and translatable member translates to reduce the arm angle.

2. The input mechanism assembly of claim 1, wherein the compressible seal is formed of at least one of silicone, polyurethane, hydrogenated nitrile butadiene rubber, or a fluoroelastomer.

3. The input mechanism assembly of claim 1, wherein:
    the first arm has a first end and a second end;
    the second arm has a third end and a fourth end;
    the first and third ends are unconnected; and
    the second and fourth ends are connected at the base portion.

4. The input mechanism assembly of claim 1, wherein the compressible seal obscures at least one component that is at least one of formed of a different material than the manipulation structure or has a different finish than the manipulation structure.

5. The input mechanism assembly of claim 1, wherein rotation of the rotatable and translatable member is not transferred to the compressible seal.

6. The input mechanism assembly of claim 1, wherein the contaminants comprise liquid absent hydrostatic pressure.

7. A wearable electronic device, comprising:
    a body including an aperture;
    a crown comprising:
        a knob; and
        a stem coupled to the knob and positioned at least partially within the aperture;
    a tactile structure connected to the crown that is actuatable by translation of the crown; and
    an elastomer Y-ring positioned between the crown and the body comprising a pair of hingedly connected limbs that each contact one of the body or the knob, the pair of hingedly connected limbs define a space and an arm angle between the limbs; wherein:
    the limbs pivot to reduce the arm angle in response to the knob moving towards the body; and
    the elastomer Y-ring is operable to move freely of the body or the crown.

8. The wearable electronic device of claim 7, wherein rotation of the crown is transferred to the elastomer Y-ring.

9. The wearable electronic device of claim 7, further comprising a gasket positioned between the crown and the body that is shaped to define an indent into which the gasket is configured to expand when compressed.

10. The wearable electronic device of claim 7, wherein a shape of a force curve corresponding to actuation of the tactile structure by the translation of the crown is unchanged by the elastomer Y-ring.

11. The wearable electronic device of claim 7, wherein the elastomer Y-ring is configured to prevent light passage.

12. The wearable electronic device of claim 11, wherein a finish or a color of the elastomer Y-ring is configured to prevent light passage.

13. A wearable electronic device, comprising:
    a body including an aperture;
    a crown comprising:
        a knob; and
        a stem coupled to the knob and positioned at least partially within the aperture;
    a tactile structure connected to the crown that is actuatable by translation of the crown; and
    an elastomer Y-ring positioned between the crown and the body comprising a pair of limbs connected at a base that define an arm angle of a space between the limbs; wherein
    the limbs move at the base to reduce the arm angle in response the knob moving toward the body;
    a first of the limbs contacts the body and a second of the limbs contacts the knob; and
    rotation of the crown is transferred to the elastomer Y-ring.

14. A wearable electronic device, comprising:
    a body including an aperture;
    a crown comprising:
        a knob; and
        a stem coupled to the knob and positioned at least partially within the aperture;

a tactile structure that is actuatable by translation of the crown;

an elastomer Y-ring positioned between the crown and the body and comprising a pair of connected limbs, each in contact with one of the body or the crown, the pair of connected limbs configured to pivot to reduce an arm angle of a space formed by the pair of connected limbs when the crown translates to move the knob toward the body; and a gasket positioned between the crown and the body that is shaped to define an indent into which the gasket is configured to expand when compressed.

15. A wearable electronic device, comprising:

a body including an aperture;

a crown comprising:
  a knob;
  a stem coupled to the knob and positioned at least partially within the aperture;

a tactile structure connected to the crown that is actuatable by translation of the crown; and an elastomer Y-ring positioned between the crown and the body comprising connected limbs that pivot at a connection point to reduce an arm angle of a space defined between the connected limbs when the crown translates to move the knob toward the body;

wherein:
  a first limb of the connected limbs is in contact with the body and a second limb of the connected limbs is in contact with the crown; and
  a shape of a force curve corresponding to actuation of the tactile structure by the translation of the crown is substantially unchanged by the elastomer Y-ring.

* * * * *